United States Patent
LaFrese et al.

(10) Patent No.: US 8,024,517 B2
(45) Date of Patent: Sep. 20, 2011

(54) PROACTIVE TECHNIQUE FOR REDUCING OCCURRENCE OF LONG WRITE SERVICE TIME FOR A STORAGE DEVICE WITH A WRITE CACHE

(75) Inventors: Lee Charles LaFrese, Tucson, AZ (US); Christopher Michael Sansone, Tucson, AZ (US); Dana Fairbairn Scott, Tucson, AZ (US); Yan Xu, Tucson, AZ (US); Olga Yiparaki, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/363,266

(22) Filed: Jan. 30, 2009

(65) Prior Publication Data

US 2010/0199050 A1    Aug. 5, 2010

(51) Int. Cl.
*G06F 12/00*    (2006.01)
*G06F 13/00*    (2006.01)

(52) U.S. Cl. ........... 711/113; 711/112; 711/118; 710/35
(58) Field of Classification Search .................. 711/113
See application file for complete search history.

(56) References Cited

U.S. PATENT DOCUMENTS

| | | |
|---|---|---|
| 6,779,058 B2 | 8/2004 | Kishi et al. |
| 7,000,088 B1 | 2/2006 | Rudeseal et al. |
| 7,031,928 B1 | 4/2006 | Cochran |
| 7,171,516 B2 | 1/2007 | Lowe et al. |

*Primary Examiner* — Alford W Kindred
*Assistant Examiner* — Stella Eun
(74) *Attorney, Agent, or Firm* — Janaki K. Davda; Konrad Raynes and Victor LLP (57) ABSTRACT

Provided are techniques for introducing a delay in responding to host write requests. A percentage of fullness of a write cache is determined. Based on the determined percentage of fullness of the write cache (f), a low cache threshold (L), alpha ($\alpha$), and k, an amount of delay to introduce into responding to a host write request is determined. Techniques wait the amount of the delay before responding to the host write request although the host write request processing has completed.

21 Claims, 8 Drawing Sheets

PROACTIVE TECHNIQUE FOR REDUCING OCCURRENCE OF LONG WRITE SERVICE TIME FOR A STORAGE DEVICE WITH A WRITE CACHE

BACKGROUND

1. Field

Embodiments of the invention relate to a proactive technique for reducing occurrence of long write service time for a storage device with a write cache.

2. Description of the Related Art

A host (also known as a "host computer") includes applications that may issue write requests (also known as a type of Input/Output (I/O) commands) to a disk storage system. The disk storage system includes write cache and disk storage (also known as backend disk storage) and is capable of writing data to the disk storage in response to the write requests.

Caching may be described as storing data in a write cache before writing the data to the disk storage. Caching is a common way to achieve electronic speed performance for writes to a disk storage system. The disk storage system with write cache stores data associated with the write requests in the write cache first and later writes the data to the disk storage (typically a slower medium) asynchronously.

This setup works well to improve performance as write caches are substantially faster than other storage devices (such as disk storage). However, since the capacity of the write cache is orders of magnitude smaller than the total capacity of the disk storage, destaging (moving data from the write cache to the disk storage) is important in managing the disk storage system.

Write caching avoids some disk operations altogether by eliminating re-writes and gathering together adjacent blocks of data so that they may be destaged in fewer physical operations. For write caching to be effective, data should be destaged quickly enough so that the write cache does not become full. If the write cache becomes full, it is necessary to hold off write requests from the applications at the host until space in the write cache is made available by completing some amount of destaging of data from the write cache to the disk storage. Delays of this nature may take a long time to resolve (e.g., 100 milliseconds (ms) or longer, which is several orders of magnitude higher than the electronic speeds on the order of one ms that writes normally take). Thus, there may be a long delay on a few write requests, while the other write requests are fast.

Existing techniques employ a simple threshold mechanism with one or more thresholds to prevent the write cache from becoming full. With such a threshold mechanism, once the write cache reaches a certain threshold, the disk storage system destages data from the write cache to the disk storage as quickly as possible. Thus, these thresholds trigger faster and faster destaging activity.

While these thresholds work well in some cases, there are occasions when a burst of host writing activity can quickly fill up the write cache to near its maximum capacity. When this happens, host write requests are held off entirely (i.e., not processed by the disk storage system until enough destaging activity can take place in order to make room for new data to be written to the write cache). Holding off the write requests results in a sudden drop in performance, as host write requests experience long delays.

Many applications are not tolerant of long duration write requests and may time-out.

Thus, with conventional write cache techniques, when there is enough space available in the write cache, the host write requests are serviced quickly (e.g., within a few milliseconds). When the write cache is full, the host write requests are "on hold" for a period of time, until there is enough space available in the write cache to write the data from the host application). When there are bursts of host write requests, the host may experience long write request response times, which may result in applications at the host timing out (i.e., the write requests are failed). Bursts of host requests may be described a large number of write requests issued close together.

Thus, there is a need in the art for avoiding long delays on write requests.

BRIEF SUMMARY

Provided are a method, computer program product, and system for introducing a delay in responding to host write requests. A percentage of fullness of a write cache is determined. Based on the determined percentage of fullness of the write cache (f), a low cache threshold (L), alpha (α), and k, an amount of delay to introduce into responding to a host write request is determined. Techniques wait the amount of the delay before responding to the host write request although the host write request processing has completed.

BRIEF DESCRIPTION OF THE SEVERAL VIEWS OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments preemptively slow down write requests and provide a threshold mechanism to reduce the probability of reaching a write cache full condition. In a write cache full condition, the storage system tells the host to hold off on sending write requests.

Figure 1:
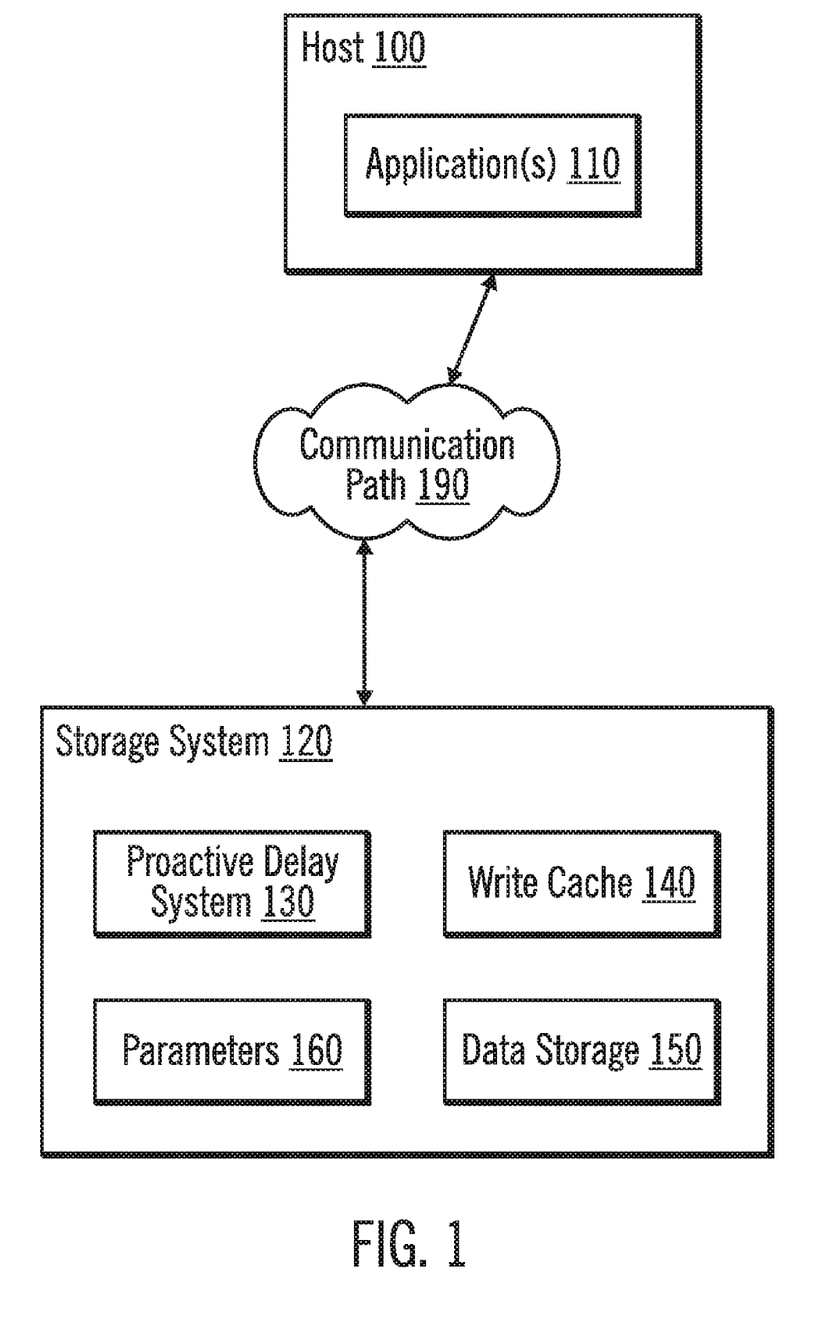
FIG. 1 illustrates details of a computing environment in accordance with certain embodiments.

FIG. 1 illustrates details of a computing environment in accordance with certain embodiments. A host 100 is connected via a connection path 190 to a storage system 120. The host 100 includes one or more application(s) 110.

The storage system 120 includes a proactive delay system 130, a write cache 140, data storage 150, and parameters 160. In certain embodiments, the parameters 160 are stored in an internal data structure within microcode or internal to the storage system 120. The parameters include a low cache threshold (represented by L), a high cache threshold (represented by H), a percentage of fullness of the write cache (represented by f), alpha (represented by α), and k. Alpha and k may be described as cache throttling factors.

The connection path 190 may comprise any type of connection path, such as, for example, a peer-to-peer network, spoke and hub network, Storage Area Network (SAN), a Local Area Network (LAN), Wide Area Network (WAN), the Internet, an Intranet, etc.

The data storage 150 may be described as backend data storage. The data storage 150 may comprise an array of storage devices, such as Direct Access Storage Devices (DASDs), Just a Bunch of Disks (JBOD), Redundant Array of Independent Disks (RAID), virtualization device, etc.

Embodiments provide a small delay spread across many write requests. Embodiments avoid a write cache full situation by preemptively adding a graduated delay in responding to write requests as a function of how full the write cache is. The host 100 issues a write request, waits for a response to the write request, and then issues another write request. Because the host 100 does not issue a second write request until receiving a response to a first write request, delaying the response to the host 100 will distribute the write requests to the storage system 120 to achieve a more stable response time for write requests and improved ability to meet quality of service objectives.

Figure 2:
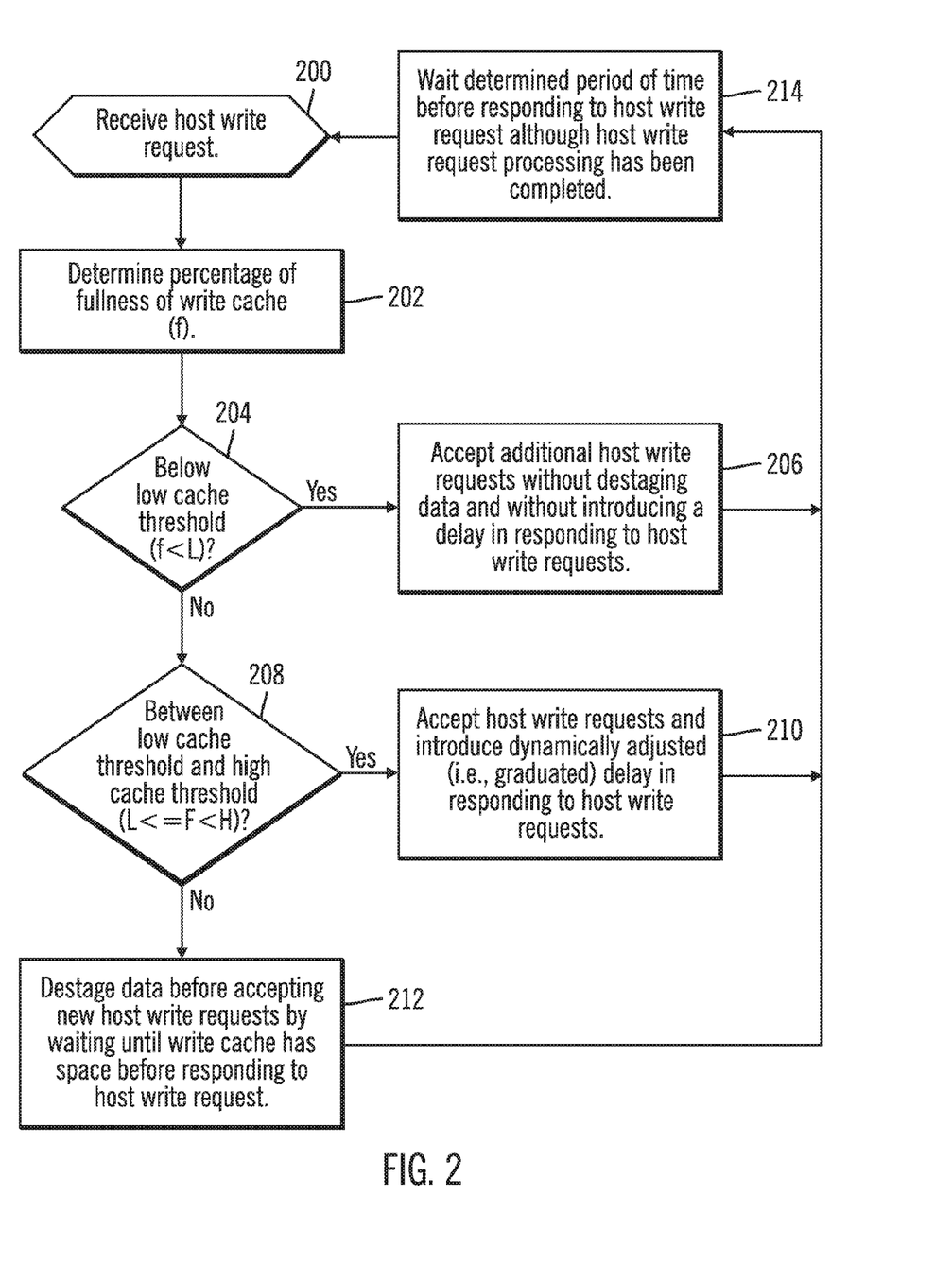
FIG. 2 illustrates logic performed in accordance with certain embodiments.

FIG. 2 illustrates logic performed in accordance with certain embodiments. Control begins in block 200 with the storage system 120 receiving a host 100 write request. In block 202, the proactive delay system 130 determines a percentage of fullness of the write cache 140 (represented by f). In block 204, the proactive delay system 130 determines whether the percentage of fullness of the write cache 140 is less than a low cache threshold (f<L). If so, processing continues to block 206, otherwise, processing continues to block 208. In block 206, the proactive delay system 130 accepts host write requests without destaging data and without introducing a delay in responding to host write requests. That is, when the percentage of fullness of the write cache (f) is below the low cache threshold (L), the proactive delay system 130 accepts additional host 100 write requests, while not destaging data, as it usually helps to aggregate some data to improve performance. When the percentage of fullness of the write cache (f) is below the low cache threshold (L), the amount of delay in responding to host 100 write requests is zero. From block 206, processing continues to block 214.

In block 208, the proactive delay system 130 determines whether the percentage of fullness of the write cache 140 is greater than or equal to the low cache threshold and less than a high cache threshold (L<=f<H). If so, processing continues to block 210, otherwise, processing continues to block 212. In block 210, the proactive delay system 130 accepts host write requests and introduces a dynamically adjusted (i.e., graduated) delay in responding to the host write requests. From block 210, processing continues to block 214.

In block 212, if the percentage of fullness of the write cache 140 is greater than or equal to the high cache threshold (f>=H), the proactive delay system 130 destages data before accepting new host write requests by waiting until the write cache 140 has space before responding to the host 100 write request. That is, the amount of delay in responding to the host write request is determined by an amount of time used for destaging the data. From block 212, processing continues to block 214.

In block 214, the storage system 120 waits a period of time (i.e., introduces a delay) before responding to the host 100 write request although the host 100 write request processing has completed. The response may be, for example, an indication that the write request has been processed.

Figure 3:
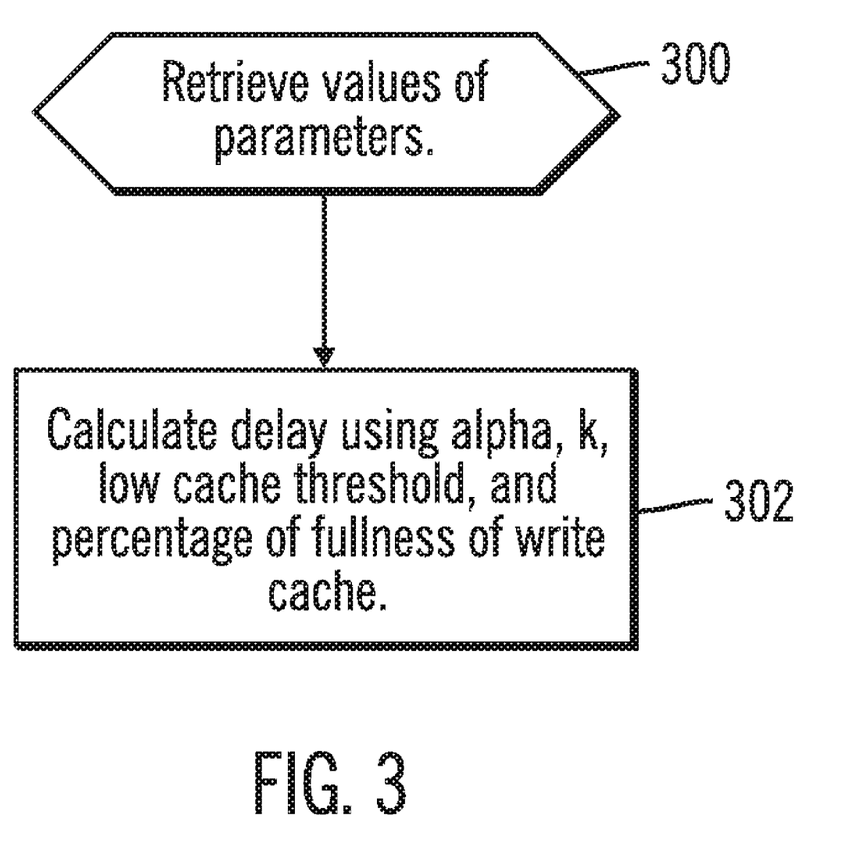
FIG. 3 illustrates logic for determining an amount of delay to introduce in responding to a host write request.

FIG. 3 illustrates logic for determining an amount of delay to introduce in responding to a host write request. Control begins at block 300 with the proactive delay system 130 retrieving values for parameters 160. The parameters include a low cache threshold (represented by L), a high cache threshold (represented by H), a percentage of fullness of the write cache (represented by f), alpha (represented by α), and k.

In certain embodiments, the low cache threshold (L) and high cache threshold (H) parameters are set in microcode. In certain alternative embodiments, the low cache threshold (L) and high cache threshold (H) parameters are set by a user (e.g., a customer or administrator). The fullness of the write cache is calculated based on the amount of data stored in the write cache.

In certain embodiments, parameter α and parameter k are set by a designer of the storage system 120. In such embodiments, the storage system 120 stores hard coded values for parameter α and parameter k. In certain alternative embodiments, a user (e.g., a customer or administrator) has control to tune the storage system 120 to an application by adjusting one or both of parameter α and parameter k. In other words, if an application is known to have bursts of writes, the customer may want to adjust values for parameter α and parameter k so that the technique becomes more aggressive to prevent long time-outs. In certain further embodiments, parameter k is autonomically calculated. In such autonomic embodiments, past data is used to infer future operations using the Bayesian Algorithm.

In block 310, the proactive delay system 130 calculates an amount of delay using Equation (1). The proactive delay system 130 calculates the delay (represented by P(f)) using the low cache threshold (represented by L), the high cache threshold (represented by H), the percentage of fullness of the write cache (represented by f), alpha (represented by α), and k.

$$P(f) = \begin{cases} 0 & \text{if } f < L \\ \frac{k}{\alpha - f} - \frac{k}{\alpha - L} & \text{if } L \le f < H \\ \infty & \text{if } f \ge H \end{cases} \quad \text{Equation (1)}$$

With reference to Equation (1), when the percentage of fullness of the write cache (f) is below the low cache threshold (L), there is no delay introduced in responding to the host 100 write requests.

With reference to Equation (1), when the percentage of fullness of the write cache (f) is equal to or above the high cache threshold (H), the proactive delay system 130 introduces an undetermined delay (represented by infinity (∞) in Equation (1)) in responding to host 100 write requests in order to free up write cache 140 space for new data to be written.

With reference to Equation (1), when the percentage of fullness of the write cache (f) is greater than or equal to the low cache threshold (L) and less than the high cache threshold (H), the proactive delay system 130 introduces a delay in responding to the host 100 write request using Equation (2) to calculate the delay:

$$\left\{ \frac{k}{\alpha - f} - \frac{k}{\alpha - L} \quad \text{if } L \le f < H \right. \quad \text{Equation (2)}$$

Thus, using equations (1) and (2), the proactive delay system 130 introduces longer and longer delays in responding to the host 100 write request as the write cache 140 fills up more. The increasingly larger delays enable the storage system 120 to react dynamically to prevent or substantially reduce the likelihood of reaching a write cache 140 full condition. In certain embodiments, the write cache 140 full condition is reached when the high cache threshold (H) is met.

By preemptively introducing such delays, the storage system 120 runs more smoothly and enables applications 110 at the host 100 to adjust accordingly. In certain embodiments, the delays are a worse-than-linear function of the write cache 140 utilization.

In this manner, embodiments provide a pre-emptive pacing mechanism for host 100 write requests to a storage system 120 in order to prevent sudden and substantial drops in performance when the host 100 has a burst of writing activity. Storage devices 120 that use caching can benefit from this, as it can help prevent or reduce the likelihood of delaying new host writing activity while the storage system 120 destages data from the write cache 140 to a data storage 150 (e.g., a slower medium).

Certain embodiments enable a user (e.g., a customer or administrator) to adjust the value of the parameter $\alpha$ as a minimum value of H (the high cache threshold), and the parameter $\alpha$ can be adjusted to manipulate the asymptote (i.e., the closer the value of parameter $\alpha$ is to H, the more aggressive the pacing mechanism is, all other things being equal; the larger $\alpha$ is to H, the less aggressive the pacing mechanism is, all other things being equal). That is, the parameter alpha is set to be larger than H. For example, if alpha is only 10% larger than H (i.e., if alpha is equal to 1.1*H), the pacing will be more aggressive than if alpha is 50% larger than H (i.e., if alpha is 1.5*H).

That is, the parameter $\alpha$ may be any value greater than H. When considered graphically, the value of the parameter $\alpha$ is merely an asymptote, but in terms of embodiments, the parameter $\alpha$ represents a way of controlling the aggressiveness of the pacing mechanism. That is, the closer is the parameter $\alpha$ is to H, the larger the interjected delays will be as the percentage of fullness of the write cache (f) approaches the high cache threshold (H).

Certain embodiments autonomically adjust k, which determines how aggressive the pacing mechanism will be (i.e., how large the delay). Certain embodiments look at the fullness of the write cache 140 to determine when to inject delay. An aggressive setting would cause a larger injected delay when the write cache is near the low boundary (or low cache threshold (L)). A less aggressive setting will not inject as much delay when the write cache fullness is near the low boundary. In certain embodiments, past history is used to adjust the amount of delay (e.g., a self healing technique detects and corrects improper settings.

Figure 4:
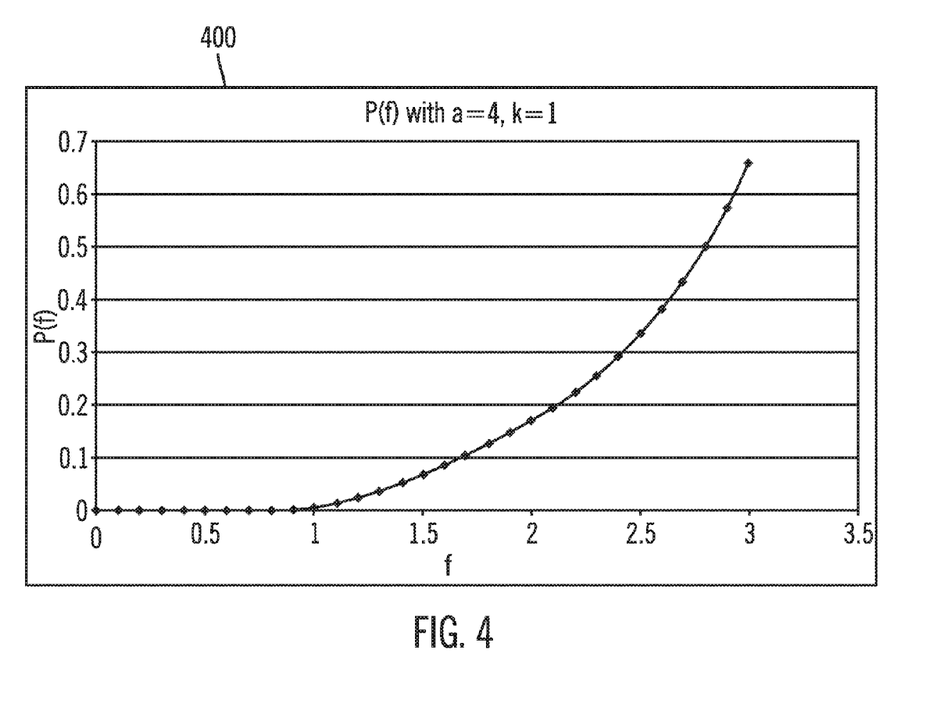
FIG. 4 illustrates a graph with parameter α set to 4 and parameter k set to 1 in accordance with embodiments.
Figure 5:
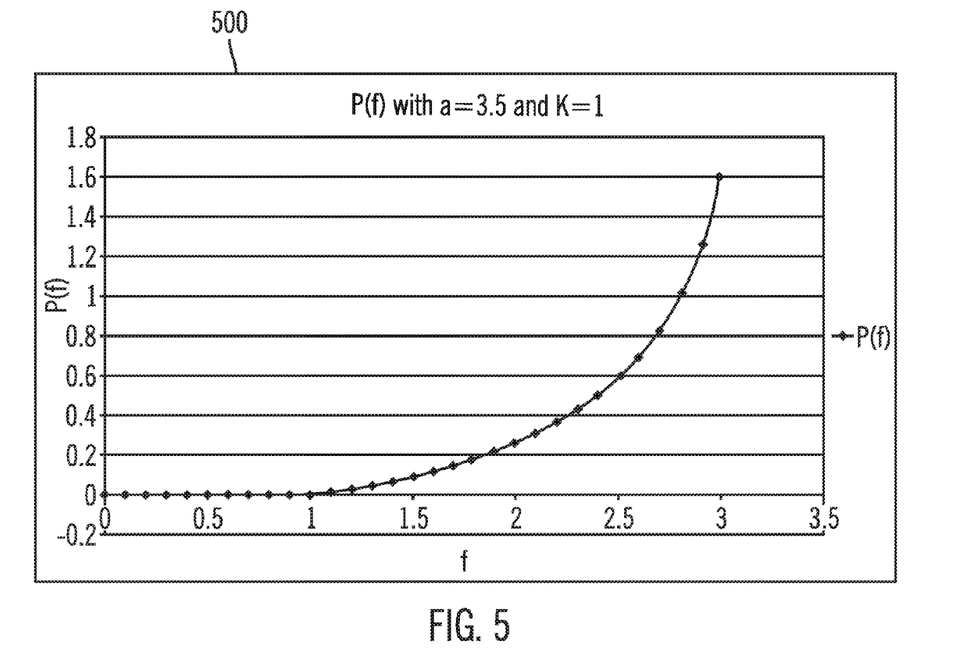
FIG. 5 illustrates a graph with parameter α set to 3.5 and parameter k set to 1 in accordance with embodiments.
Figure 6:
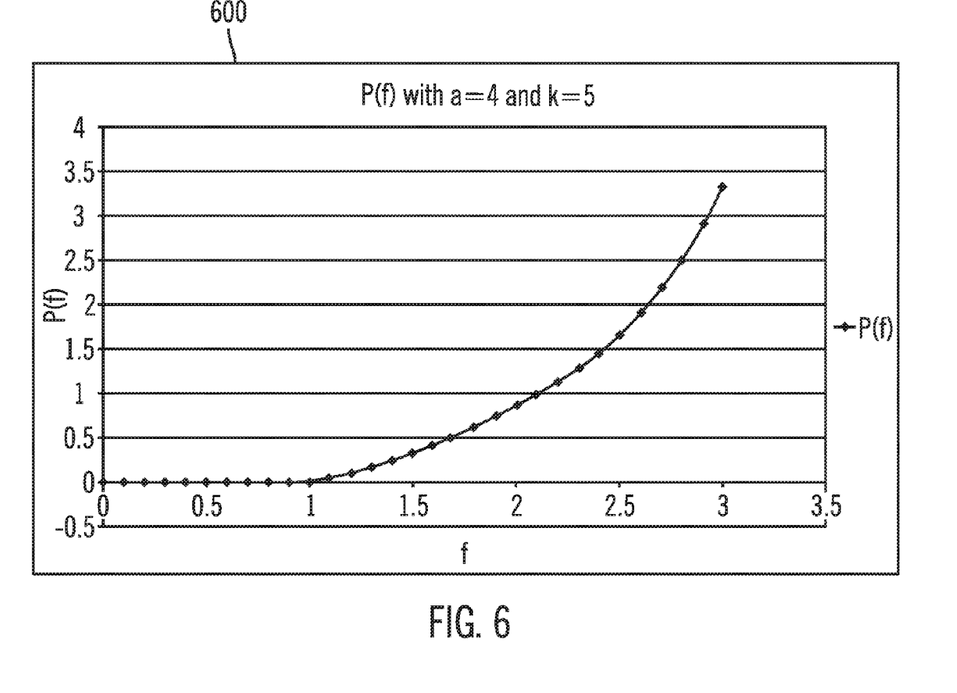
FIG. 6 illustrates a graph with parameter α set to 4 and parameter k set to 5 in accordance with embodiments.

FIG. 4 illustrates a graph 400 with parameter $\alpha$ set to 4 and parameter k set to 1 in accordance with embodiments. FIG. 5 illustrates a graph 500 with parameter $\alpha$ set to 3.5 and parameter k set to 1 in accordance with embodiments. FIG. 6 illustrates a graph 600 with parameter $\alpha$ set to 4 and parameter k set to 5 in accordance with embodiments.

For example, graph 400 (FIG. 4) and graph 500 (FIG. 5) below compare the delays (calculated with Equation (1)) when parameter $\alpha$ is 4 or 3.5, while other parameters are kept constant (H=3, and k=1).

Likewise, all other values being the same, changing the value of k adjusts the aggressiveness of the pacing mechanism, which can be seen in graph 400 (FIG. 4) and graph 600 (FIG. 6). The parameter k may be described as a "knob" that enables embodiments to adjust the aggressiveness of the pacing mechanism. The difference that k makes is to increase the delay (calculated using Equation (1)) before the percentage of fullness of the write cache (f) gets close to the high cache threshold (H).

Figure 7:
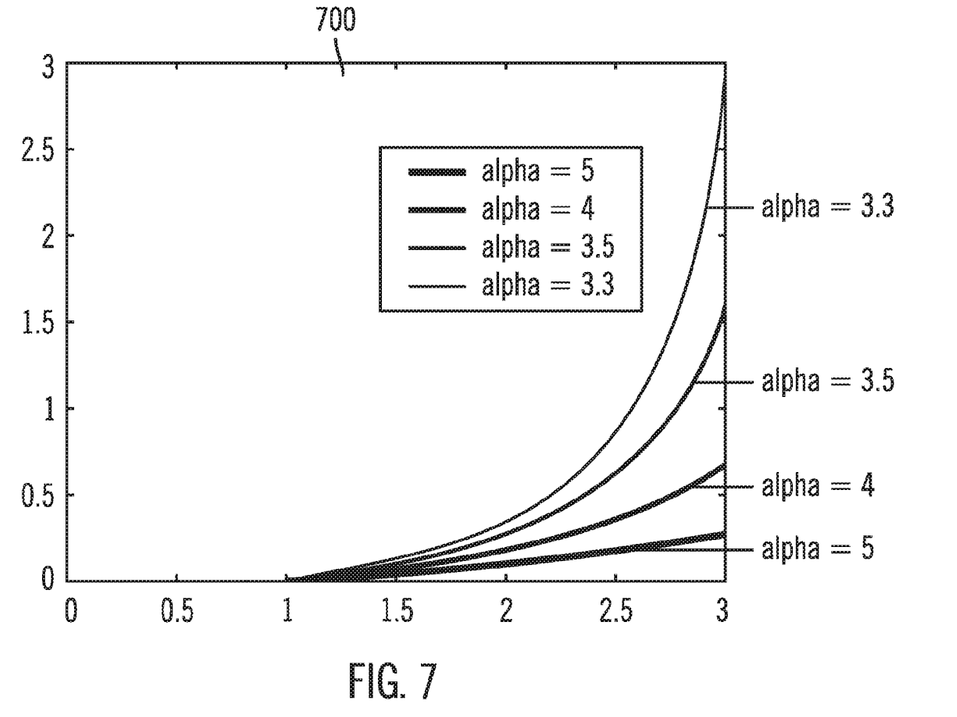
FIG. 7 illustrates a graph with parameter α set to various values in accordance with embodiments.

FIG. 7 illustrates a graph 700 with parameter $\alpha$ set to various values in accordance with embodiments. In graph 700, there are four curves, each curve depicts P(f) (vertical axis) as a function of f (horizontal axis). In graph 700, the value of L is fixed at 1, the value of H is fixed at 3, and the value of k is fixed at 1. The value of alpha is changed to generate the four curves: a curve for which alpha=5, a curve for which alpha=4, a curve for which alpha=3.5, and a curve for which alpha=3.3. The values of alpha in graph 700 are larger than H (set at 3 in this example).

Note that as alpha gets closer to 3, the pacing is more aggressive. If alpha=6, the result would be a "flatter" curve than the curve for which alpha=5, resulting in a less aggressive pacing. Note also that the four curves in graph 700 show that there is no pacing at all (i.e., P(f)=0) when f is less than L. The differences in pacing exist for values of f between L and H (i.e., between 1 and 3 in this example).

In various embodiments, the value of parameter k may be determined in various ways. In certain embodiments, the value of parameter k is determined with Equation (3), where m represents the minimum value the microcode (in the storage system 120) allows.

$$k = m \times (H-L) \qquad \text{Equation (3)}$$

In certain alternative embodiments, the value of k is determined using Bayesian inference, thereby enabling an autonomic pacing mechanism that "learns" from the previous behavior of the storage system 120 and the workload's characteristics.

For such an autonomic pacing mechanism, the initial value of k is determined with Equation (3), and subsequent values of k are determined with Equation (4). Let D(k) be the prior distribution of parameter k. Initially, it is assumed that parameter k is uniformly distributed, and an initial value of parameter k is determined with Equation (3). Let T be the event that f<=H. Event T is a desirable event as embodiments try to adjust the pacing to avoid getting too close to the high cache threshold. Subsequent instances of the value of k are determined by calculating a distribution D(k|T), a posterior distribution of k, by calculating Equation (4).

$$D(k \mid T) = \frac{p(T \mid k) D(k)}{\int_0^\infty p(T \mid k) \cdot D(k) dk} \qquad \text{Equation (4)}$$

In equation (4), "p" represents a probability. Having the distribution D(k|T), a new value for k may be the smallest number v such that the probability p(k>=v|T)>=some percentage (e.g., 51%).

An additional variation may focus on a number of recent values of the parameter k in determining the posterior distribution. For example, by considering the most recent 1000 values of the parameter k or the values of parameter k calculated in the last 24 hours.

The parameters alpha and k can change according to the particular embodiments. Embodiments do not require a fixed or particular frequency of change.

Thus, embodiments introduce increasingly larger delays that enable the storage system 120 to react autonomically (by adjusting the values of parameter $\alpha$ and parameter k), before the percentage of fullness of the write cache reaches the high cache threshold (H).

Therefore, embodiments minimize the probability of hitting long host 100 write request response times when there are bursts in host 100 write requests. In the case in which there are bursts of host 100 write requests, embodiments slow down the host 100 write request rate by injecting some delay into the response. Especially because a burst of writing activity may not be avoidable, embodiments enable the storage system 120 to absorb the new burst of data by introducing a graduated delay to responding to the host write requests. With the graduated delay, the storage system 120 gives the write cache 140 time to destage data to the data storage 150 in the background, which will free up space in the write cache 140 and slow down the rate at which the write cache 140 is filled above some threshold.

This results in a smoother operation of the storage system 100 and eliminates or substantially reduces the likelihood of reaching a write cache 140 full condition, thereby avoiding long delays for host 100 write requests. With embodiments, the storage system 120 is able to smoothen out spikes in host 100 write requests.

Additional Embodiment Details

As will be appreciated by one skilled in the art, embodiments may be implemented as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, embodiments may take the form of a computer program product embodied in any tangible medium of expression having computer-useable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Current examples of optical disks include compact disk-read only memory (CD-ROM), compact disk-read/write (CD-R/W) and DVD. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The code implementing the described operations may further be implemented in a logic device or hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

The embodiments are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2 and 3 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2 and 3 may be implemented in software, hardware, programmable and non-programmable gate array logic or in some combination of hardware, software, or gate array logic.

Figure 8:
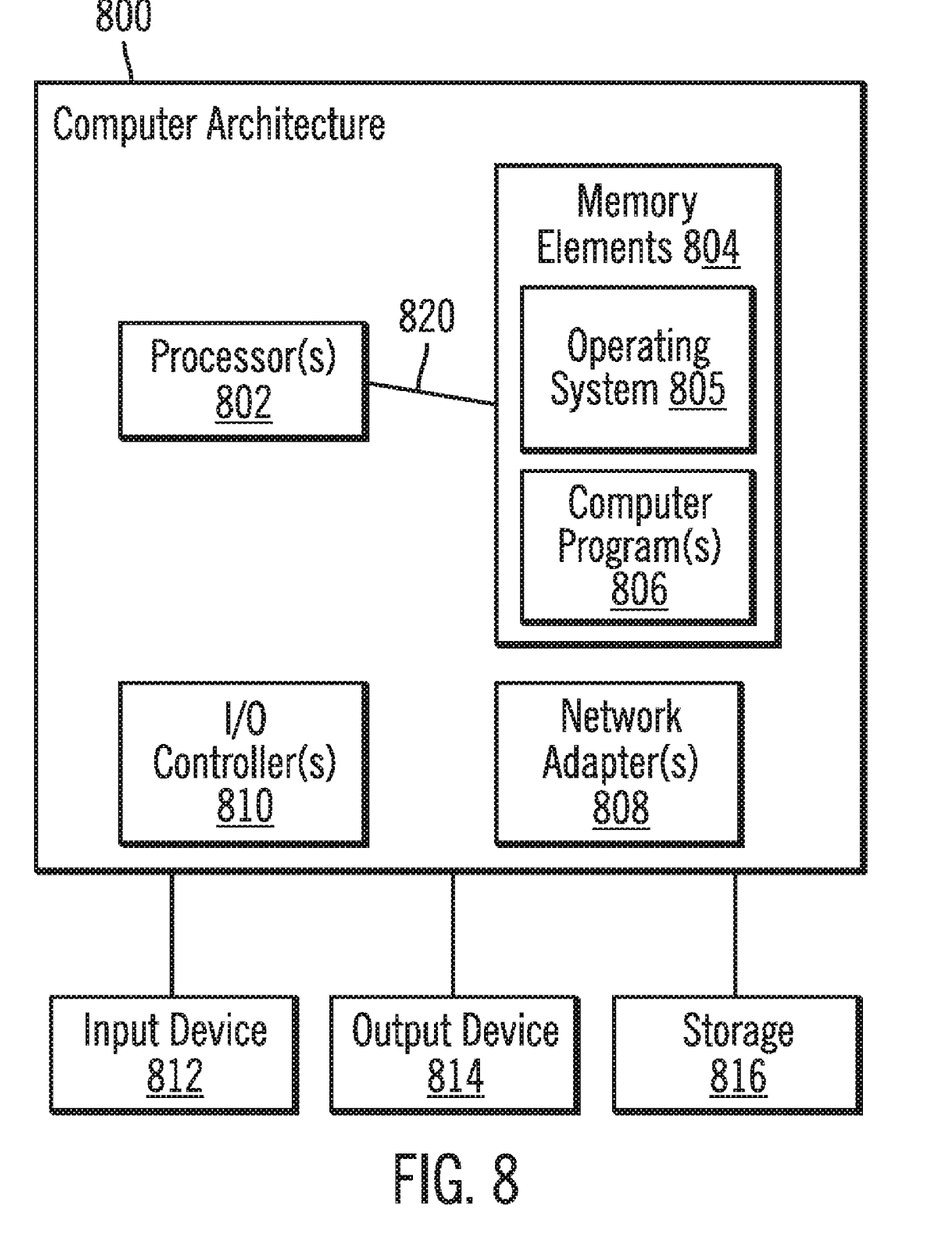
FIG. 8 illustrates a system architecture that may be used in accordance with certain embodiments.

FIG. 8 illustrates a system architecture 800 that may be used in accordance with certain embodiments. Host 100 and/or storage system 120 may implement system architecture 800. The system architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The system architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The system architecture 800 may include fewer components than illustrated, additional components not illustrated herein, or some combination of the components illustrated and additional components. The system architecture 800 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A computer program product comprising a non-transitory computer-readable medium including a computer readable program, wherein the computer readable program when executed on a computer causes the computer to:

determine a percentage of fullness of a write cache;

based on the determined percentage of fullness of the write cache (f), a low cache threshold (L), a high cache threshold (H), alpha ($\alpha$), and k, determine an amount of delay to introduce into responding to a host write request by calculating:

$$P(f) = \begin{cases} 0 & \text{if } f < L \\ \frac{k}{\alpha - f} - \frac{k}{\alpha - L} & \text{if } L \leq f < H, \\ \infty & \text{if } f \geq H \end{cases}$$

wherein alpha and k are cache throttling factors; and wait the amount of the delay before responding to the host write request although the host write request processing has completed.

2. The computer program product of claim 1, wherein the computer readable program when executed on a computer causes the computer to:

determine that the percentage of fullness of the write cache is less than the low cache threshold; and accept additional host write requests, while not destaging data, wherein the amount of delay is zero.

3. The computer program product of claim 1, wherein the computer readable program when executed on a computer causes the computer to:

determine that the percentage of fullness of the write cache is greater than or equal to the low cache threshold and less than the high cache threshold; and accept additional host write requests, wherein the amount of delay for responding to the host write requests is dynamically adjusted.

4. The computer program product of claim 1, wherein the computer readable program when executed on a computer causes the computer to:

determine that the percentage of fullness of the write cache is greater than or equal to the high cache threshold; and destage data before accepting new host write requests, wherein the amount of delay is determined by an amount of time used for destaging the data.

5. The computer program product of claim 1, wherein alpha has a minimum value of the high cache threshold and can be adjusted to manipulate an asymptote.

6. The computer program product of claim 1, wherein the computer readable program when executed on a computer causes the computer to determine an initial value of k by calculating:

$$k = m \times (H-L)$$

where m represents a minimum value microcode allows.

7. The computer program product of claim 1, wherein the computer readable program when executed on a computer causes the computer to determine subsequent values of k by calculating distribution D(k|T):

$$D(k \mid T) = \frac{p(T \mid k)D(k)}{\int_0^\infty p(T \mid k) \cdot D(k)dk}$$

where D(k) is a prior distribution of parameter k and T is an event that f<=H.

8. A computer system apparatus, comprising:
a memory;
a logic device in communication with the memory, the logic device being capable of performing operations, the operations comprising:
determining a percentage of fullness of a write cache;
based on the determined percentage of fullness of the write cache (f), a low cache threshold (L), a high cache threshold (H), alpha (α), and k, determining an amount of delay to introduce into responding to a host write request by calculating:

$$P(f) = \begin{cases} 0 & \text{if } f < L \\ \frac{k}{\alpha - f} - \frac{k}{\alpha - L} & \text{if } L \leq f < H, \\ \infty & \text{if } f \geq H \end{cases}$$

, wherein alpha and k are cache throttling factors; and
waiting the amount of the delay before responding to the host write request although the host write request processing has completed.

9. The computer system apparatus of claim 8, wherein the operations further comprise:
determining that the percentage of fullness of the write cache is less than the low cache threshold; and
accepting additional host write requests, while not destaging data, wherein the amount of delay is zero.

10. The computer system apparatus of claim 8, wherein the operations further comprise:
determining that the percentage of fullness of the write cache is greater than or equal to the low cache threshold and less than the high cache threshold; and
accepting additional host write requests, wherein the amount of delay for responding to the host write requests is dynamically adjusted.

11. The computer system apparatus of claim 8, wherein the operations further comprise:
determining that the percentage of fullness of the write cache is greater than or equal to the high cache threshold; and
destaging data before accepting new host write requests, wherein the amount of delay is determined by an amount of time used for destaging the data.

12. The computer system apparatus of claim 8, wherein alpha has a minimum value of the high cache threshold and can be adjusted to manipulate an asymptote.

13. The computer system apparatus of claim 8, wherein the computer readable program when executed on a computer causes the computer to determine an initial value of k by calculating:

$k = m \times (H-L)$ where m represents a minimum value microcode allows.

14. The computer system apparatus of claim 8, wherein the computer readable program when executed on a computer causes the computer to determine subsequent values of k by calculating distribution D(k|T):

$$D(k \mid T) = \frac{p(T \mid k)D(k)}{\int_0^\infty p(T \mid k) \cdot D(k)dk}$$

where D(k) is a prior distribution of parameter k and T is an event that f<=H.

15. A computer-implemented method, comprising:
determining by a computer a percentage of fullness of a write cache;
based on the determined percentage of fullness of the write cache (f), a low cache threshold (L), a high cache threshold (H), alpha (α), and k, determining an amount of delay to introduce into responding to a host write request by calculating:

$$P(f) = \begin{cases} 0 & \text{if } f < L \\ \frac{k}{\alpha - f} - \frac{k}{\alpha - L} & \text{if } L \leq f < H, \\ \infty & \text{if } f \geq H \end{cases}$$

, wherein alpha and k are cache throttling factors; and
waiting the amount of the delay before responding to the host write request although the host write request processing has completed.

16. The method of claim 15, further comprising:
determining that the percentage of fullness of the write cache is less than the low cache threshold; and
accepting additional host write requests, while not destaging data, wherein the amount of delay is zero.

17. The method of claim 15, further comprising:
determining that the percentage of fullness of the write cache is greater than or equal to the low cache threshold and less than the high cache threshold; and
accepting additional host write requests, wherein the amount of delay for responding to the host write requests is dynamically adjusted.

18. The method of claim 15, further comprising:
determining that the percentage of fullness of the write cache is greater than or equal to the high cache threshold; and
destaging data before accepting new host write requests, wherein the amount of delay is determined by an amount of time used for destaging the data.

19. The method of claim 15, wherein alpha has a minimum value of the high cache threshold and can be adjusted to manipulate an asymptote.

20. The method of claim 15, wherein the computer readable program when executed on a computer causes the computer to determine an initial value of k by calculating:

$k = m \times (H-L)$ where m represents a minimum value microcode allows.

21. The method of claim 15, wherein the computer readable program when executed on a computer causes the computer to determine subsequent values of k by calculating distribution D(k|T):

$$D(k \mid T) = \frac{p(T \mid k)D(k)}{\int_0^\infty p(T \mid k) \cdot D(k)dk}$$

where D(k) is a prior distribution of parameter k and T is an event that f<=H.

* * * * *